United States Patent
Ehrmann

(10) Patent No.: US 6,510,816 B2
(45) Date of Patent: Jan. 28, 2003

(54) EASY CLEAN EQUINE BODY BRUSH

(76) Inventor: Douglas G. Ehrmann, 126 Ridge Rd., Chester, NY (US) 10918

( * ) Notice: Subject to any disclaimer, the term of this patent is extended or adjusted under 35 U.S.C. 154(b) by 0 days.

(21) Appl. No.: 09/748,270

(22) Filed: Dec. 27, 2000

(65) Prior Publication Data

US 2002/0078902 A1 Jun. 27, 2002

(51) Int. Cl.⁷ .............................................. A01K 13/00
(52) U.S. Cl. ...................... 119/601; 119/625; 119/615
(58) Field of Search ................... 119/625, 612, 119/613, 615, 600, 601; 15/160; 132/120, 121, 141

(56) References Cited

U.S. PATENT DOCUMENTS

| 183,758 | A | * | 10/1876 | Furter ......................... 132/120 |
| 788,418 | A | * | 4/1905 | Milligan ...................... 132/120 |
| 792,013 | A | * | 6/1905 | Flemming ................... 132/120 |
| 1,031,485 | A | * | 7/1912 | Stroup ......................... 132/120 |
| 1,328,120 | A | * | 1/1920 | Bricker ....................... 132/120 |
| 3,047,898 | A | * | 8/1962 | Levite ......................... 132/120 |
| 3,690,331 | A | * | 9/1972 | Messer ........................ 132/120 |
| 4,277,193 | A | * | 7/1981 | Knaus ......................... 132/120 |
| 4,343,265 | A | * | 8/1982 | Belschner .................... 119/601 |
| 4,730,361 | A | * | 3/1988 | Koffler ......................... 15/160 |
| 5,564,148 | A | * | 10/1996 | Prevost et al. ................. 15/111 |
| 5,960,745 | A | * | 10/1999 | Boyland ..................... 119/613 |
| 6,230,659 | B1 | * | 5/2001 | Karlsson ..................... 119/601 |

* cited by examiner

Primary Examiner—Charles T. Jordan
Assistant Examiner—Judith Nelson
(74) Attorney, Agent, or Firm—James F. Cottone

(57) ABSTRACT

An equine body brush is specially formed to produce a combined cleaning and brushing action for each single stroke of the brush in a desired stroke direction by using two distinct stiffness of bristles arrayed in a linearly tapered height arrangement. The leading edge bristles are shorter and harder than the following bristles which are longer and softer. The hard bristles first pull up the dander, loose animal hair and other debris and the following soft bristles sweep them away before they get a chance to settle back down. The correct cleaning and brushing directional action can be maintained regardless of which hand the user employs by virtue of either a unique pair of handles disposed on opposite ends of the central bristle-carrying brush portion, or a smaller palm-sized hand brush.

4 Claims, 2 Drawing Sheets

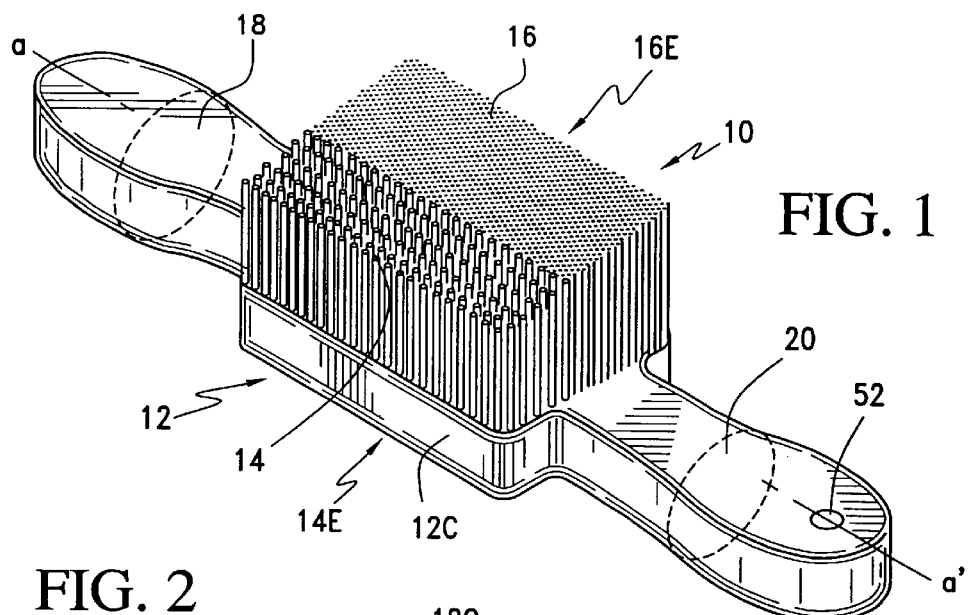
FIG. 1
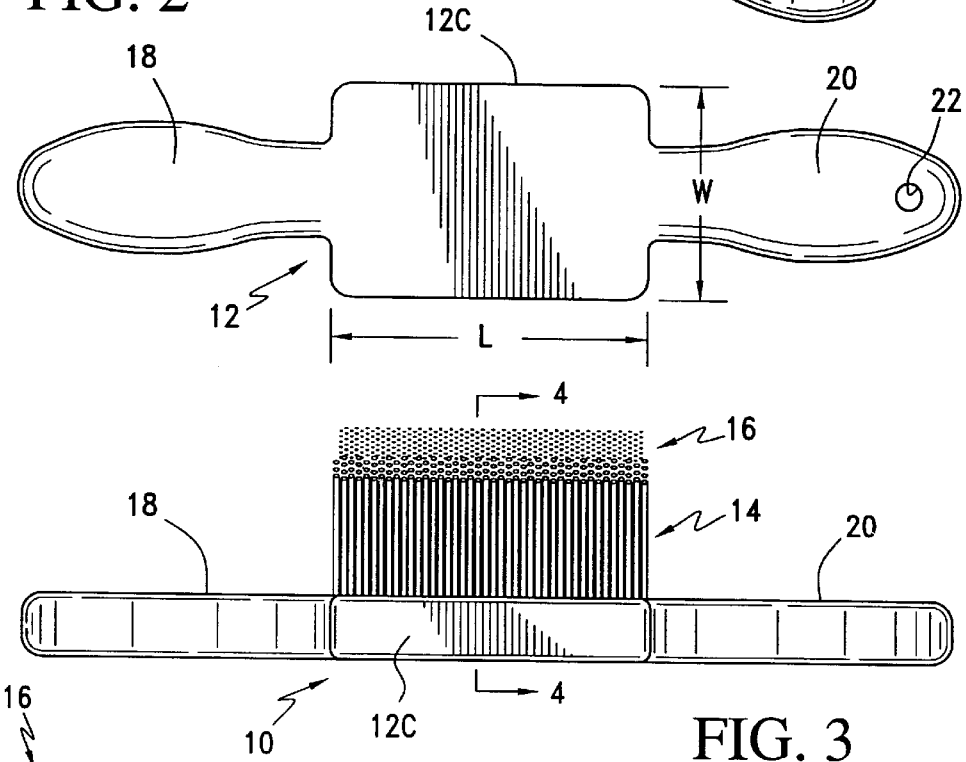
FIG. 2
FIG. 3
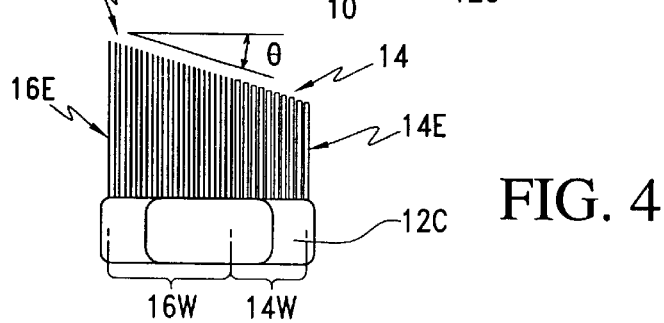
FIG. 4

EASY CLEAN EQUINE BODY BRUSH

TECHNICAL FIELD

The present invention relates generally to animal body brushes, and more particularly to a unique dual-bristle, single or dual-handled type brush having an overall bristle height which is tapered along the direction of the brushing stroke to significantly improve the cleaning and grooming of horses and similar animals.

BACKGROUND

A wide range of implements for cleaning, brushing and grooming animals' coats have been developed over the years to address the multitude of cleaning tasks encountered for various kinds of haired animals as they are maintained in differing environments. Implements generally available for equine body cleaning and brushing are of special commercial and professional importance because of the continuing high interest in presenting horses in their best possible light, as well as for the more practical benefit of maintaining the health and comfort of the animal. So, brushes, currycombs, and similar implements abound, as do methods and techniques of using them, but all have one requirement in common—a good deal of manual effort is needed for their effective use.

Descriptions of typical prior art approaches to equine body brushes may be found in a number of U.S. patents.

U.S. Pat. No. 0,430,077 issued to Jenness in 1890 discloses a horse brush formed from at least two distinct bristle stiffnesses which are arranged with a plurality of taper angles. In use, the bristle arrangement causes the brushed dirt to be caught in the brush—in spaces deliberately left between the bristle types—requiring striking the back of the brush against some object to throw out the entrapped dust and dirt.

An earlier 1870 U.S. Pat. No. 0,183,758 to Furter discloses a horse brush having two distinct set of bristles interspersed, with each set of bristles having a different height as well as stiffnes. Longer hard bristles are shown interspersed with tufts of shorter, less stiff bristles. Again, the arrangement is directed to producing points of lodgement within the brush which entrap the matter loosened by the longer stiffer bristles.

A similar U.S. Pat. No. 1,401,134 to Butterfield discloses a combined currycomb and brush, where the brush part includes tapered bristles.

Regarding the aspect of brushes for general use having linearly tapered bristles, two U.S. patents are of interest. U.S. Pat. No. 4,756,039 to Pardo and 2,043,758 to Lay both show the tapering bristles structure. In the '039 patent the bristle taper of a household broom is in a direction orthogonal to the direction of use for the purpose of allowing the forcing of the longer, harder bristles into corners being swept. In the '758 patent, a push broom has tapered coarse and fine bristles but their taper is set to make the two types of bristles align horizontally in use so as to present a smooth planar sweeping surface to the ground.

Each of these prior art devices functions more or less well within its inherent limitations, but none offers the high degree of effectiveness and significantly increased ease of use provided by the present tapered dual-bristle action, dual or single-handled equine body brush.

OBJECTS OF THE INVENTION

It is therefore a primary object of the present invention to provide an improved body brush for cleaning debris from the coats of horses and other animals.

A further object of the present invention is to provide an equine body brush specially configured to provide the benefits of linearly tapered bristles of two distinct stiffnesses to produce in a single stroke both debris cleaning followed by a sweeping away action of the loosened debris.

A still further object of the present invention is to provide improved handling of the tapered bristle body brush by the inclusion of a pair of longitudinally disposed handles at opposite sides of the brush to assure the proper direction of cleaning and brushing action regardless of which hand the user employs.

A yet further object of the present invention is to provide an improved equine body brush wherein the substantially linear bristle taper is shaped to produce an overall taper angle within a range of 8 and 45 degrees formed between the short, hard leading edge bristles to the longer, softer follow up bristles.

In a preferred embodiment, an animal brush consisting of a palm-sized, bristle-carrying central region, which may be flanked at opposite ends by a pair of contoured handles, is specifically configured to include bristles of two distinct stiffnesses formed into the central region. The bristles are substantially linearly tapered in height so as to present the shorter hard bristles at the leading edge of a cleaning stroke to dislodge and pull up the dander and loose hair, and thereafter to present its longer softer bristles to sweep away the debris preventing it from settling back down on the animal's coat or from accumulating in spaces within the bristles. The desired short/hard to long/soft action sequence is assured regardless of the hand being employed by virtue of either the oppositely disposed handles or a simpler version.

BRIEF DESCRIPTION OF THE DRAWINGS

Additional objects and advantages of the invention will become apparent to those skilled in the art as the description proceeds with reference to the accompanying drawings, wherein:

FIG. 1 is a top left perspective view of an equine body brush according to the present invention;

FIG. 2 is a bottom view of the one piece base member portion of the equine body brush;

FIG. 3 is a front elevational view of the equine body brush;

FIG. 4 is a right side elevation of the equine body brush showing the overall linear taper angle of the two bristle portions;

FIG. 6b shows an alternate shape (not to scale) of the bottom view of FIG. 6a.

BEST MODE FOR CARRYING OUT THE INVENTION

Figure 5:
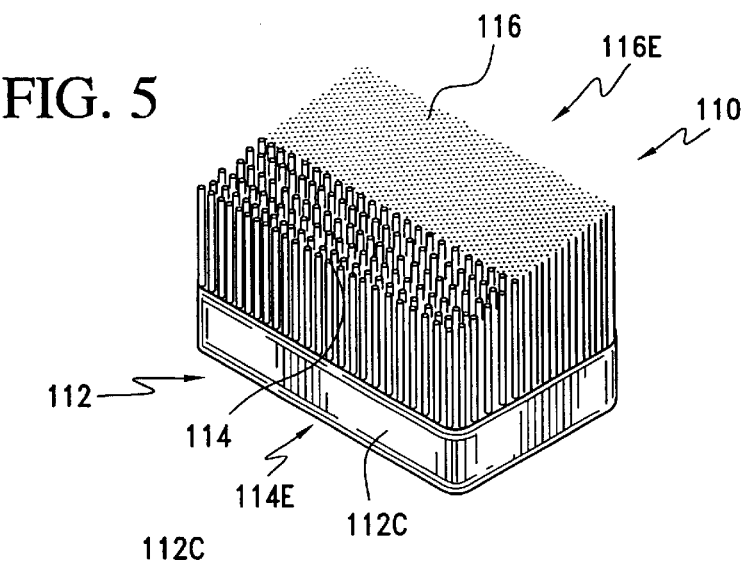
FIG. 5 is a top left perspective view of an alternate embodiment of an equine body brush according to the present invention.

Referring now to FIG. 1 there is shown a perspective view of an easy clean equine body brush according to the present invention. By way of a brief overview, a body brush shown generally at 10 includes a rigid, one piece base member 12 and two distinct bristle portions 14 and 16. The base member 12 is shaped to include a bristle-carrying central region 12C and first and second handles 18 and 20 disposed on opposite ends of the region 12C along a longitudinal axis a–a'. The bristle portion 14 includes bristles of hard or stiff material or fibers, while the bristle portion 16 includes bristles of soft or flexible material or fibers. The hard bristles 14 extend along the central region 12C for a transverse extent less than half of the transverse extent of the soft bristles, and both sets of bristles are uniformly tapered in height from a low at an outboard edge 14E of the hard bristle portion 14 to a high at an opposite outboard edge 16E of the soft bristle portion 16.

Referring to FIG. 2, a bottom view of the base member 12 shows the pair of handles 18 and 20 as each being of about the same length as the central region 12C. The base member 12 may be made of any suitably rigid material such as wood, plastic or a light weight metal, and serves to accept and securely retain arrays of the two types of bristles. In a preferred embodiment, the central region 12C is approximately 4 inches in length L (along a—a') and just under 3 inches in width W, making it just about palm-sized. The handles 18 and 20 are mirror images of each other and may be smoothly contoured in width, height and length to provide a comfortable and secure griping shape for the user's hand. The handle 20 may include a mounting/orientation hole 22.

FIGS. 3 and 4 show front and side elevations, respectively, illustrating the unique composition, shape and distribution of the two bristle types. In order to achieve the novel functional attributes of the present invention, the two bristle portions are preferably arranged with a desired taper angle, stiffness, stiffness contrast and transverse extent. One preferable embodiment found to give good cleaning and brushing results is formed to produce a taper angle θ in the range of 8 to 45 degrees, the angle chosen so as to be functionally compatible with the particular stiffnesses and stiffness contrast ratio of bristle portions 14 and 16. Typically, the height of the hard bristles at the edge 14E may be approximately 1&¼ inches and the height of the soft bristles at the edge 16E may be between 1&¼ and 3 inches. In the particular embodiment shown, the hard bristle portion extends for a width 14W and the soft bristle portion extends for a width 16W—their ratio being about 1:2. Alternately stated, the hard bristles extend for about ⅓ of the transverse width W and the soft bristles extending for the remaining ⅔ of W.

In use, the body brush 10 is handled so as to brush predominately in one direction, with the hard bristles in the lead direction pulling up the dander, debris and loose hair, and the soft bristles following so as to sweep them away—all in one stroke. This action leaves a smooth and shiny coat with a minimum of number of strokes, all made possible by the interaction between the two bristle hardnesses at an ideal taper angle θ. This unique one stroke/dual-function action causes debris that was pulled to the coat surface to be swept away before it gets a chance to settle back down.

There are a number of benefits that flow from the preferred two-handled embodiment described. The two-handled arrangement provides a major benefit in that it permits the user to rest one arm by shifting the brush to the other hand while still maintaining the desired hard lead, soft follow directional action described, without having to change his position in relation to the section of the horse's coat being groomed. Additionally, positioning the handles at the side makes brush usage more comfortable for the user, and having two handles allows the brush to be turned around (i.e. direction reversed—soft bristles in the lead) and lightly brushing down the horse's legs. Hard bristles are not used on the equine legs. The single mounting hole 22 helps remind the user to grip the brush from the correct handle.

There are certain equine grooming situations where a smaller body brush is called for, which are not optimally met by the two-handled embodiment described above. A slightly smaller alternate embodiment is shown in perspective view in FIG. 5. A palm brush 110 is depicted as having virtually the identical dual bristle arrangement as that of FIGS. 1, 3 & 4 previously described, but is notably devoid of the pair of longitudinally disposed handles. All of the functional benefits previously detailed as flowing from the dual-bristle structure are provided via the palm brush 110, plus added advantages. For ease of exposition and comparison, the numbers of the elements of the palm brush 110 embodiment of FIGS. 5–8 which have the same functions as tho se of FIGS. 1–4 carry corresponding numbers but in a higher series. For example, base member 12 and its central region 12C are now shown as 112 and 112C; hard bristle portion 14, its outboard edge 14E and hard bristle portion 14W are now shown as 114, 114E and 114W; and soft bristle portion 16, its soft bristle edge 16E and hard bristle edge 16W are now shown as 116, 116E and 116W, respectively.

The palm brush 110 of FIGS. 5–8, sized and shaped to be held comfortably in the palm of a user's hand, is especially easier to handle along a horse's body when reaching inside muscled areas, and under the belly. As with the two-handled version, the user can grip the palm brush 110 with either hand and still maintain the proper hard/soft brushing sequence. Additionally, the friction loading on the user's arm is reduced via the smaller brush, making it the ideal device for heavily soiled or encrusted areas. The smaller size makes for better controllability and less wear and tear on both the user's arm and the horse's coat.

Figure 6A:
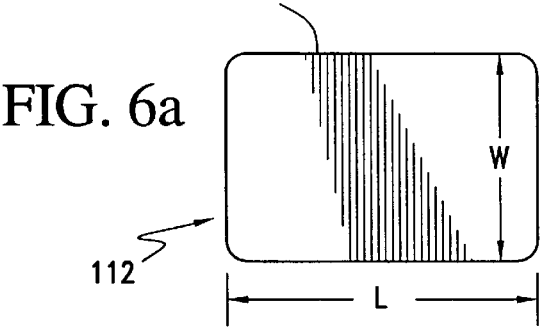
FIG. 6a shows a bottom view of the one piece bristle region of the body brush of FIG. 5.
Figure 6B:
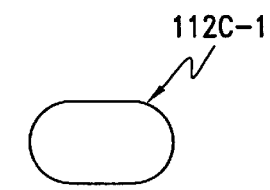
Figure 7:
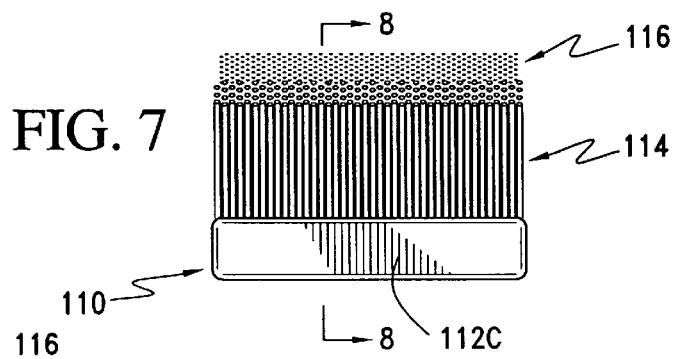
FIG. 7 is a front elevation view of the body brush of FIG. 5.
Figure 6C:
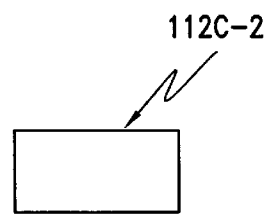
FIG. 6c shows another alternate shape (not to scale) of the bottom view of FIG. 6.
Figure 8:
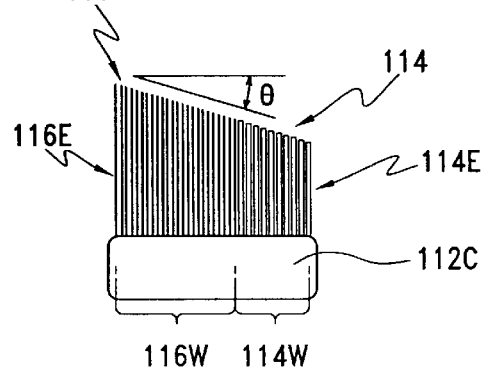
FIG. 8 is a right side elevation of the body brush of FIG. 5 showing the overall linear taper angle of the two bristle portions.

FIGS. 6a, 7 and 8 show the same views—bottom view, front elevation and side elevation, respectively—as previously described. FIGS. 6b and 6c show alternate shapes (not to scale) for the bristle carrying region 112C, namely an oval shape 112C-1 in FIG. 6b and an elongated rectangle 112C-2 of FIG. 6c. Various well known means may be formed in the base member 112C to improve the user's grip. These include (but are not specifically shown): finger grooves formed longitudinally into the sides of the base member 112C to engage the user's fingertips, an over-the-knuckle hand strap, and similar means.

Although the invention has been described in terms of preferred and alternate embodiments, the invention should not be deemed limited thereto since other embodiments and modifications will readily occur to one skilled in the art. For example, depending on the relative hardness and softness of the two types of bristles employed, the ratio of their transverse extent in width may be adjusted depending on the kind or breed of equine hair being cleaned, and on the type of debris being encountered. It is therefore to be understood that the appended claims are intended to cover all such modifications as fall within the true spirit and scope of the invention.

What is claimed is:

1. A method of cleaning and brushing the coats of horses using a dual-bristle stiffness brush handled so as to brush predominately in one direction, with hard bristles in the lead direction pulling up dander, debris and loose hair, and soft bristles following so as to sweep these materials away all in single stroke, comprising the steps of:

a) providing a hand-held brush having a bristle-carrying surface, said surface having generally longitudinally oriented edges;

b) providing a first hard bristle portion on a first portion of said surface to carry an array of hard bristles, the stiffness of said hard bristles being selected so as to dislodge and pull up dander, debris and loose hair during a first sequence of said single stroke, and a second soft bristle portion on a second portion of said surface to carry an array of soft bristles, the stiffness of said soft bristles being selected so as to sweep away the dander, debris and loose hair previously dislodged and pulled up during a second sequence of said single stroke;

c) forming a substantially linear taper on the height of said hard and soft bristles, said taper extending transversely, and selected to interact with said hard and soft bristles so as to immediately sweep away the dander, debris and loose hair during said single stroke, thereby preventing them from settling back on the horse's coat; and d) performing in use a combined cleaning and brushing action sequence wherein a user grips said brush such that a preferred one direction of cleaning and brushing is accomplished to implement the first sequence of hard short bristles leading a manual brushing stroke to dislodge and loosen said materials in said coat followed immediately in the same stroke by the second sequence of soft longer bristles to sweep away said loosened materials.

2. The method of claim 1 including the further steps of providing said hard and soft bristles over the entire extent of and between said generally longitudinally oriented edges of said base member surface and providing said hard and soft bristle portions so as to abut along a longitudinal line.

3. The method of claim 2 including the further step of providing said smoothly varying heights of said substantially linear taper extending from a shortest height at a hard bristle edge of said base member to a longest height at a soft bristle edge of said base member surface.

4. The method of claim 3 including the further step of establishing said linear taper at an angle between 8 and 30 degrees.

* * * * *